US011283960B2

(12) United States Patent
Wang et al.

(10) Patent No.: US 11,283,960 B2
(45) Date of Patent: Mar. 22, 2022

(54) PORTABLE SCANNER

(71) Applicant: Foxlink Image Technology Co., Ltd., New Taipei (TW)

(72) Inventors: Kuo Shing Wang, New Taipei (TW); Pai Hsien Su, New Taipei (TW)

(73) Assignee: Foxlink Image Technology Co., Ltd., New Taipei (TW)

( * ) Notice: Subject to any disclaimer, the term of this patent is extended or adjusted under 35 U.S.C. 154(b) by 0 days.

(21) Appl. No.: 17/156,637

(22) Filed: Jan. 25, 2021

(65) Prior Publication Data
US 2021/0306508 A1    Sep. 30, 2021

(30) Foreign Application Priority Data

Mar. 30, 2020 (TW) ................................ 109203622

(51) Int. Cl.
*H04N 1/12* (2006.01)
*H04N 1/00* (2006.01)

(52) U.S. Cl.
CPC ....... *H04N 1/1215* (2013.01); *H04N 1/00214* (2013.01); *H04N 1/123* (2013.01); *H04N 1/1295* (2013.01); *H04N 2201/0081* (2013.01); *H04N 2201/0096* (2013.01)

(58) Field of Classification Search
CPC .. H04N 1/00214; H04N 1/1215; H04N 1/123; H04N 1/1295; H04N 1/00827; H04N 1/00588; H04N 1/00236; H04N 1/00888; H04N 1/1077; H04N 1/193; G06F 1/1696

USPC ........ 358/496, 488, 473, 906, 474, 401, 501
See application file for complete search history.

(56) References Cited

U.S. PATENT DOCUMENTS

| | | | |
|---|---|---|---|
| 6,791,720 B1 * | 9/2004 | Hsieh ................. | H04N 1/00236 358/442 |
| 8,736,927 B2 * | 5/2014 | Lee ....................... | H04N 1/193 358/498 |
| 2007/0095917 A1 * | 5/2007 | van Os ............... | H04N 1/00588 235/454 |
| 2009/0021799 A1 * | 1/2009 | Os ...................... | H04N 1/00827 358/474 |
| 2010/0097663 A1 * | 4/2010 | Tan ...................... | H04N 1/1215 358/474 |
| 2010/0321745 A1 * | 12/2010 | Van Os ............. | H04N 1/00888 358/498 |

(Continued)

Primary Examiner — Chad Dickerson
(74) Attorney, Agent, or Firm — Lin & Associates Intellectual Property, Inc.

(57) ABSTRACT

A portable scanner includes a housing, a transmitting path, a scanning unit and a transmission module. The transmitting path longitudinally penetrates through two opposite sides of the housing. One side of the transmitting path forms a first channel, and the other side of the transmitting path forms a second channel. The scanning unit is arranged in the transmitting path and partially projects into the first channel. The transmission module is arranged in the transmitting path and partially projects into the first channel. The transmission module is in contact with the scanning unit. The transmission module includes a transmission roller. The scanning unit and the transmission roller are disposed to two facing sides of the transmitting path along an up-down direction. The scanning unit is disposed on and contacts with the transmission roller in the transmitting path.

19 Claims, 15 Drawing Sheets

(56) References Cited

U.S. PATENT DOCUMENTS

2014/0071502 A1\* 3/2014 Liu ................... H04N 1/1077
358/498
2014/0118803 A1\* 5/2014 Lee ..................... H04N 1/193
358/498

\* cited by examiner

PORTABLE SCANNER

CROSS-REFERENCE TO RELATED APPLICATION

The present application is based on, and claims priority from, Taiwan Patent Application No. 109203622, filed Mar. 30, 2020, the disclosure of which is hereby incorporated by reference herein in its entirety.

BACKGROUND OF THE INVENTION

1. Field of the Invention

The present invention generally relates to a scanner, and more particularly to a portable scanner which has a smaller size, a lower cost and is without limiting a thickness of a scanned document.

2. The Related Art

In order to make a document used, stored and published more easily and faster, optical scanners are widely used in multiple applications to convert paper-based text and graphic data into electronic formats so as to facilitate for subsequent data processing, and among all of scanners, portable scanners with their advantages of small sizes and portabilities become excellent choices.

Referring to FIG. 12 to FIG. 15, a portable scanner in prior art generally includes a transmitting path 203, a scanning unit 202, such as a contact image sensor (CIS) located in the transmitting path 203, a first transmission module 200 and a second transmission module 201 relatively located at an upstream position and a downstream position of the scanning unit 202.

The portable scanner needs the larger transmitting path 203 and a stable power source to scan the document with turning pages, so the portable scanner on the market is mostly designed with two rollers. The portable scanner designed with the two rollers generally need the first transmission module 200 and the second transmission module 201 which are disposed as a set and are matched with the scanning unit 202 to complete scanning the document. But when the document to be scanned is stapled with an binding edge, because a thickness of the document changes greatly, conditions of images trembling and having no way of passing through the transmitting path 203 are easily caused, a size of the transmitting path 203 of the portable scanner and a torsion force of each roller need be increased to ensure that a scan of the portable scanner is completed, and correspondingly a height and electricity consumption of the portable scanner are increased to increase a cost of the portable scanner.

The second transmission module 201 is located at the downstream position of the scanning unit 202, and rotates slightly faster than the first transmission module 200 located at the upstream position of the scanning unit 202 for applying a tension to the document to be scanned, thus the first transmission module 200 and the second transmission module 201 not only feed the document to be scanned through the scanning unit 202, but also keep the document to be scanned flat for reaching better scanning quality.

However, the portable scanner is short in processing bound documents, the bound documents 7 may be thicker, and required data may be located on any page of the bound documents 7, the bound documents 7 could be too thick to be positioned in the transmitting path 203. Even if the bound documents 7 are fit for the transmitting path 203, some pages of the bound documents 7 may be without being rightly located at a middle of the bound documents 7, so two sides of the bound documents 7 have different thicknesses as shown in FIG. 15, correspondingly, some pages of the bound documents 7 to be scanned may be without being clamped between the first transmission module 200 and the second transmission module 201, in that situation, the page of the bound documents 7 is almost impossible to be maintained to contact with the first transmission module 200 and the second transmission module 201.

Therefore, it is necessary to provide a portable scanner which has a smaller size, a lower cost and is without limiting a thickness of a scanned document.

SUMMARY OF THE INVENTION

An object of the present invention is to provide a portable scanner adapted for scanning a document having a binding edge or the document without the binding edge. The portable scanner includes a housing, a transmitting path, a scanning unit and a transmission module. The transmitting path horizontally and longitudinally penetrates through two opposite sides of the housing. One side of the transmitting path forms a first channel passing through one side surface of the housing, and the other side of the transmitting path forms a second channel passing through the other side surface of the housing. The scanning unit is arranged in the transmitting path and partially projects into the first channel. The transmission module is arranged in the transmitting path and partially projects into the first channel. The transmission module is in contact with the scanning unit. The transmission module includes a transmission roller. The scanning unit and the transmission roller are disposed to two facing sides of the transmitting path along an up-down direction. The scanning unit is disposed on and contacts with the transmission roller in the first channel of the transmitting path. The scanning unit and the transmission roller are disposed in the first channel and away from the second channel. The transmission roller is driven to rotate in a forward direction or rotate in a reverse direction. When the document having the binding edge is scanned by the portable scanner, the transmission roller rotates in the reverse direction, one edge of the document having the binding edge is fed into the transmitting path through the first channel, the one edge of the document having the binding edge is opposite to the binding edge, the transmission roller drives the document having the binding edge to enter the transmitting path until the document having the binding edge is fed to a set distance, after the document having the binding edge is fed to the set distance, the transmission roller stops rotating, and then, the transmission roller rotates in the forward direction to feed the document having the binding edge out of the transmitting path from the first channel, simultaneously, the scanning unit scans the document having the binding edge. When the document without the binding edge is scanned by the portable scanner, the document without the binding edge enters the transmitting path through the second channel, at the time of a front end of the document without the binding edge contacting the transmission roller, the transmission roller drives the document without the binding edge to be fed out of the transmitting path through the first channel, simultaneously, the scanning unit scans the document without the binding edge until a tail end of the document without the binding edge leaving the transmission roller.

Another object of the present invention is to provide a portable scanner adapted for scanning a document without a binding edge. The portable scanner includes a housing, a transmitting path, a scanning unit and a transmission module. The housing includes an upper housing and a lower housing interlocked with the upper housing. The transmitting path is formed between the upper housing and the lower housing. The transmitting path longitudinally penetrates through two opposite sides of the housing. One side of the transmitting path forms a first channel passing through one side surface of the housing, and the other side of the transmitting path forms a second channel passing through the other side surface of the housing. The scanning unit is arranged in the transmitting path and partially projects into the first channel. The transmission module is arranged in the transmitting path and partially projects into the first channel. The transmission module is in contact with the scanning unit. The transmission module includes a transmission roller. The scanning unit and the transmission roller are disposed to two facing sides of the transmitting path along an up-down direction. The scanning unit is disposed on and contacts with the transmission roller in the first channel of the transmitting path. The scanning unit and the transmission roller are disposed in the first channel and away from the second channel. The transmission roller is driven to rotate in a forward direction or rotate in a reverse direction. When the document without the binding edge is scanned by the portable scanner, the document without the binding edge enters the transmitting path through the second channel, at the time of a front end of the document without the binding edge contacting the transmission roller, the transmission roller drives the document without the binding edge to be fed out of the transmitting path through the first channel, simultaneously, the scanning unit scans the document without the binding edge until a tail end of the document without the binding edge leaving the transmission roller.

Another object of the present invention is to provide a portable scanner adapted for scanning a document having a binding edge. The portable scanner includes a housing, a transmitting path, a scanning unit, at least one memory and a transmission module. The transmitting path longitudinally penetrates through two opposite sides of the housing. One side of the transmitting path forms a first channel passing through one side surface of the housing, and the other side of the transmitting path forms a second channel passing through the other side surface of the housing. The scanning unit is arranged in the transmitting path and partially projects into the first channel. The at least one memory includes at least one execution module stored in the at least one memory. The at least one execution module has a plurality of instructions for scanning the document having the binding edge. The transmission module is arranged in the transmitting path and partially projects into the first channel. The transmission module is in contact with the scanning unit. The transmission module includes a transmission roller. The scanning unit and the transmission roller are disposed to two facing sides of the transmitting path along an up-down direction. The scanning unit is disposed on and contacts with the transmission roller in the first channel of the transmitting path. The scanning unit and the transmission roller are disposed in the first channel and away from the second channel. The transmission roller is driven to rotate in a forward direction or rotate in a reverse direction. When the document having the binding edge is scanned by the portable scanner, the transmission roller rotates in the reverse direction, one edge of the document having the binding edge is fed into the transmitting path through the first channel, the one edge of the document having the binding edge is opposite to the binding edge, the transmission roller drives the document having the binding edge to enter the transmitting path until the document having the binding edge is fed to a set distance, after the document having the binding edge is fed to the set distance, the transmission roller stops rotating, and then, the transmission roller rotates in the forward direction to feed the document having the binding edge out of the transmitting path from the first channel, simultaneously, the scanning unit scans the document having the binding edge.

As described above, when the portable scanner scans thin paper, or a thin card, the thin paper or the thin card enters the transmitting path through the second channel, and the thin paper or the thin card is fed out of the transmitting path from the first channel, and when the portable scanner scans the document having a thickness or the binding edge, the document having the thickness or the binding edge enters the transmitting path through the first channel, the transmission roller rotates in the reverse direction to feed in the document having the thickness or the binding edge from the first channel, the transmission roller drives the document having the thickness or the binding edge to be fed in until the transmission roller rotates to feed in the document having the thickness or the binding edge to a set distance, at the moment, the transmission roller stops rotating, later, the transmission roller rotates in the forward direction to feed out the document having the thickness or the binding edge from the first channel, simultaneously, the scanning unit executes a scanning function to acquire an image of the document having the thickness or the binding edge. A preset time method, a person control or a sensor sensing method is able to be applied to the set distance. Furthermore, a torsion force of a motor is decreased to lower power consumption by virtue of the transmission roller of the portable scanner being without contacting the binding edge of the document. As a result, the portable scanner has a smaller size, a lower cost and is without limiting the thickness of the scanned document.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
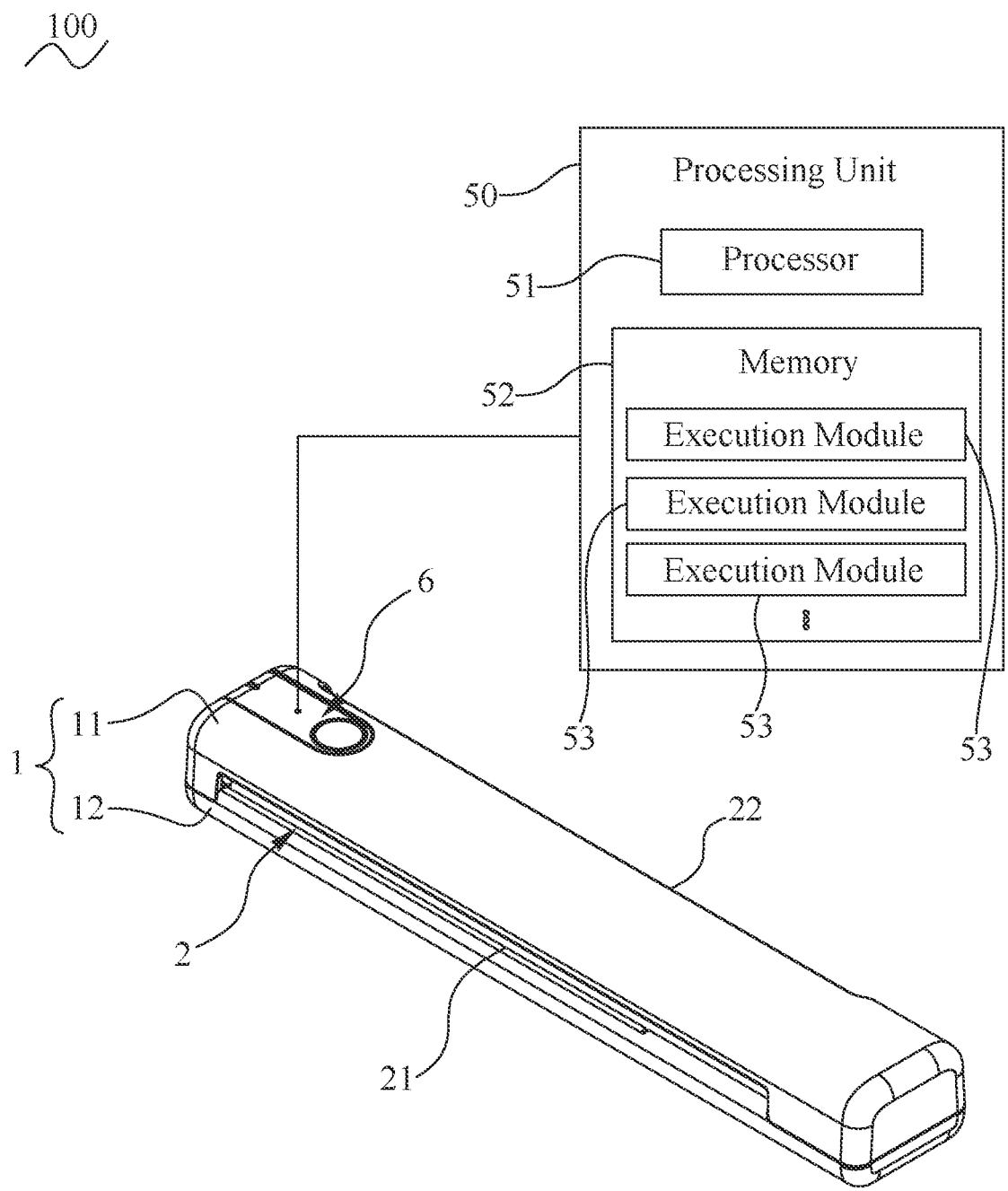
FIG. 1 is a perspective view of a portable scanner in accordance with a first preferred embodiment of the present invention.
Figure 2:
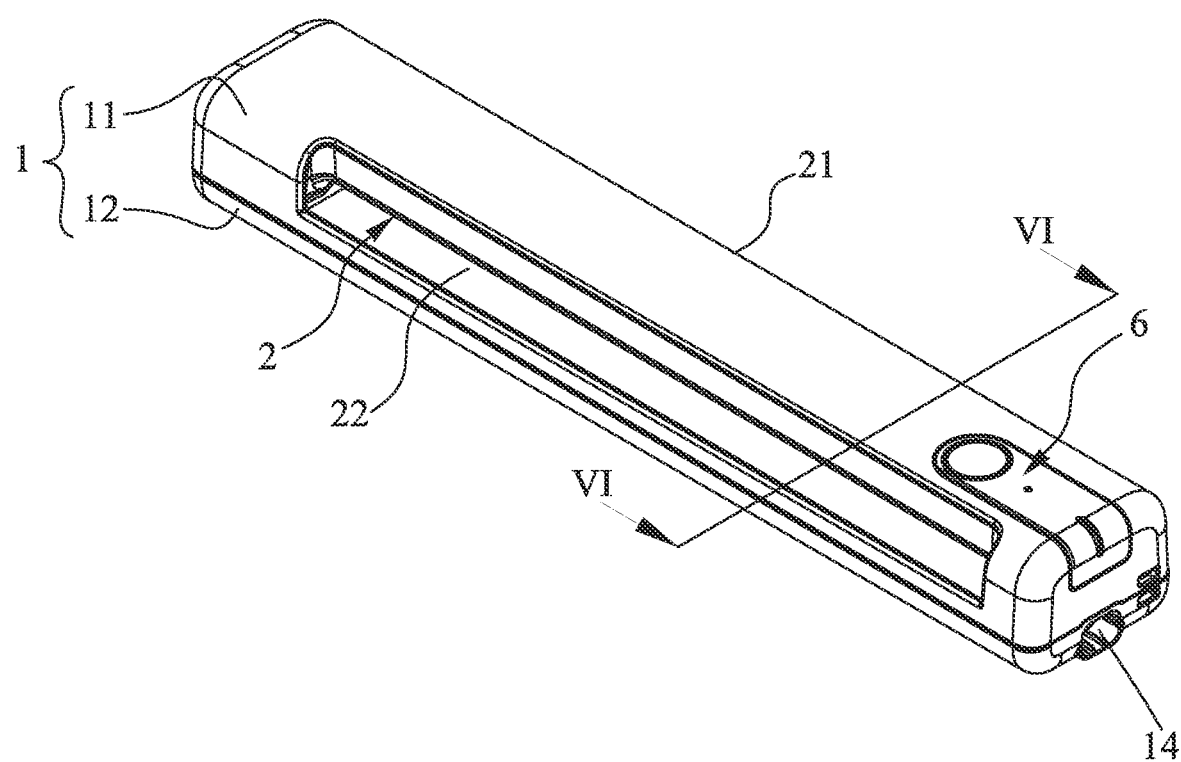
FIG. 2 is another perspective view of the portable scanner in accordance with the first preferred embodiment of the present invention.
Figure 3:
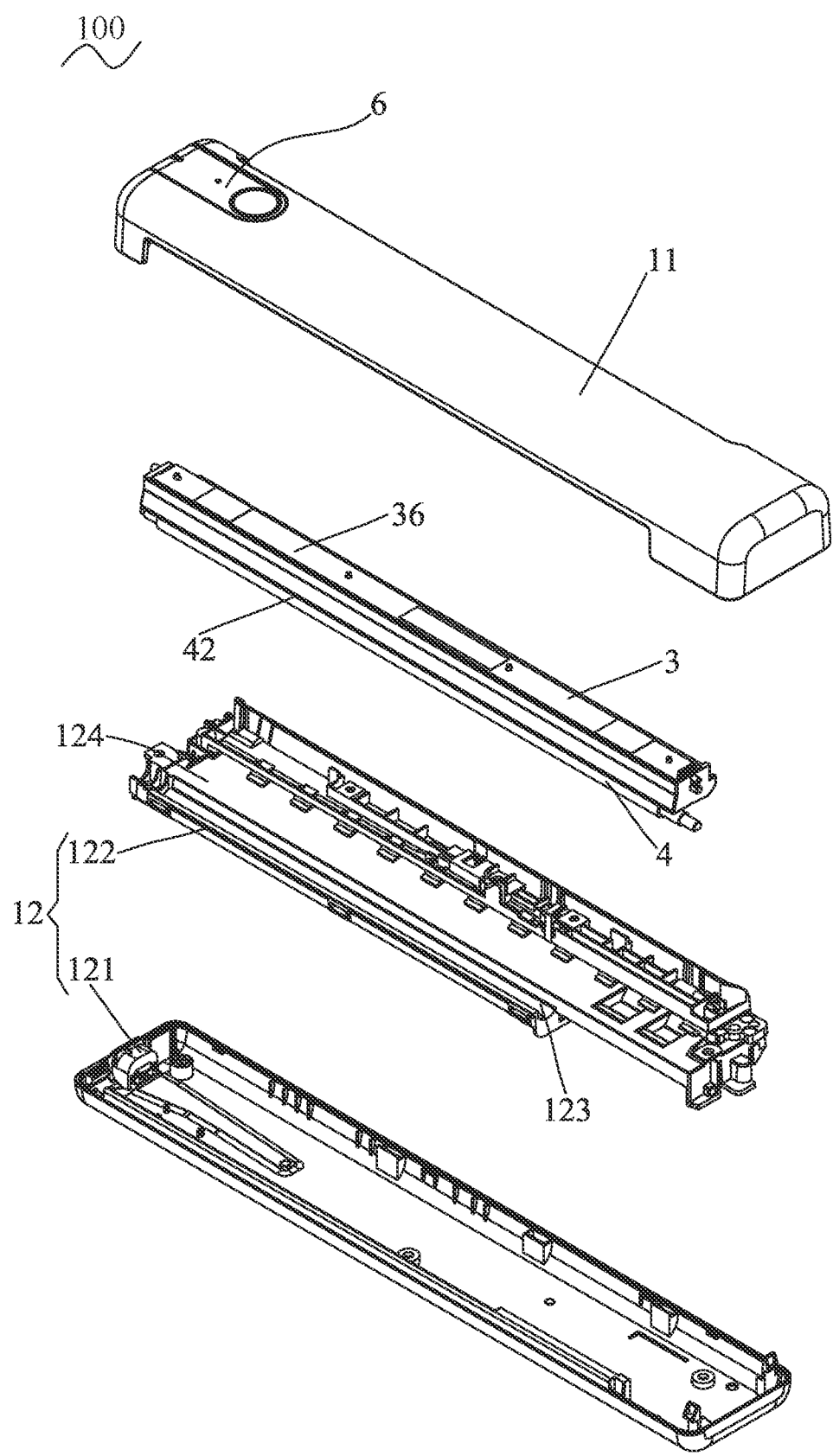
FIG. 3 is an exploded view of the portable scanner in accordance with the first preferred embodiment of the present invention.
Figure 4:
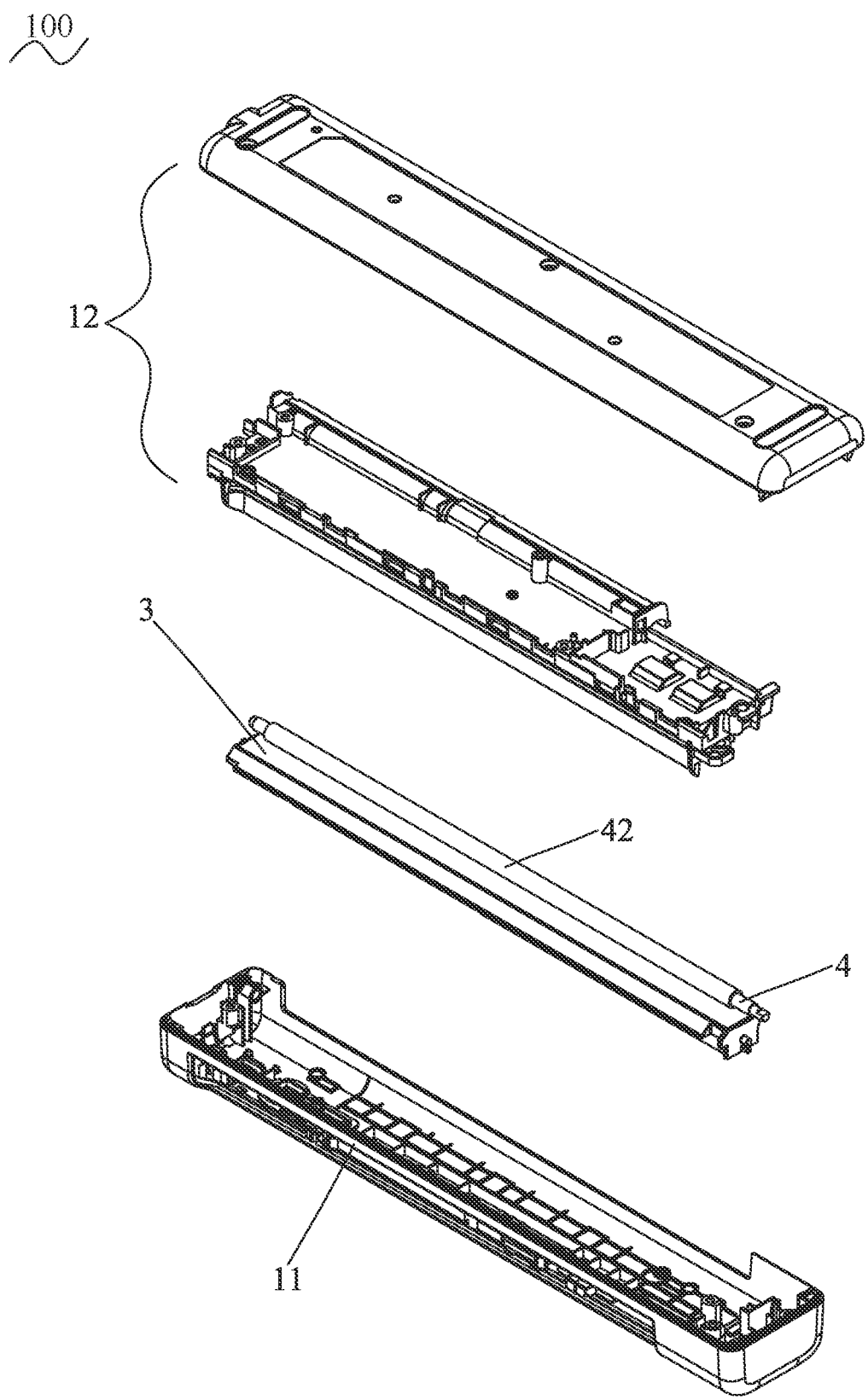
FIG. 4 is another exploded view of the portable scanner in accordance with first preferred embodiment of the present invention.
Figure 5:
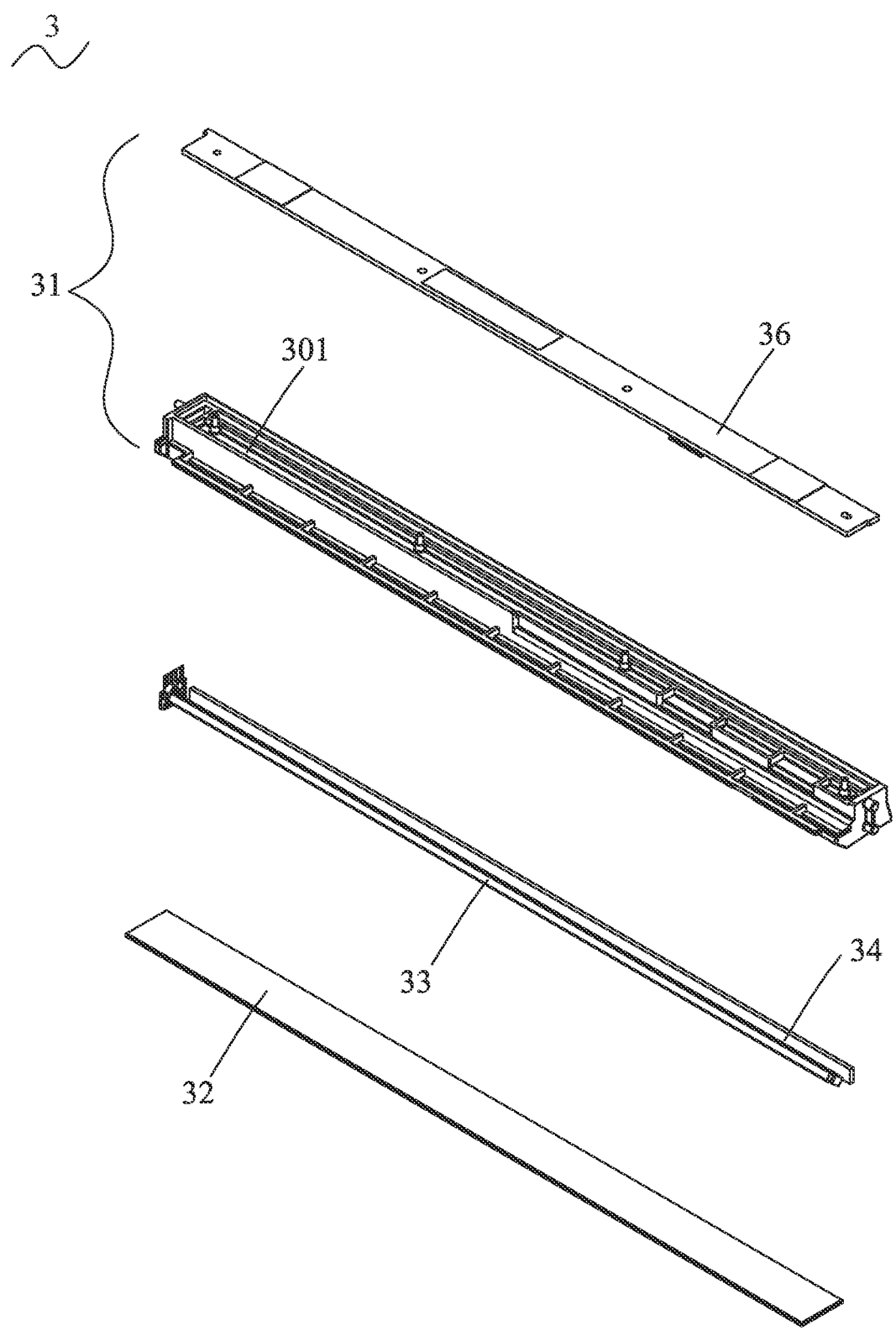
FIG. 5 is an exploded view of a scanning unit of the portable scanner in accordance with the first preferred embodiment of the present invention.

With reference to FIG. 1 to FIG. 6, a portable scanner 100 in accordance with a preferred embodiment of the present invention is shown. The portable scanner 100 is adapted for scanning a document 7 having a binding edge 71 or the document 7 without the binding edge 71. The portable scanner 100 includes a housing 1 which includes an upper housing 11 and a lower housing 12 interlocked with the upper housing 11, a transmitting path 2 which is formed between the upper housing 11 and the lower housing 12, a scanning unit 3 arranged in the transmitting path 2, a transmission module 4 arranged in the transmitting path 2 and in contact with the scanning unit 3, a processing unit 50, a motor 81, and a user interaction unit 6 arranged on a surface of the housing 1. The processing unit 50 includes at least one processor 51 and at least one memory 52.

The lower housing 12 includes a base portion 121, and a supporting element 122 mounted on the base portion 121. The transmission module 4 is disposed to and spaced from one side of a top surface of the supporting element 122. The motor 81 is mounted to the lower housing 12 of the housing 1. The motor 81 is connected with a corresponding mechanism of the transmission module 4. The upper housing 11 is fastened on the lower housing 12 to form the housing 1. The supporting element 122 and the transmission module 4 are mounted between the upper housing 11 and the base portion 121 of the lower housing 12.

Referring to FIG. 1, FIG. 2, FIG. 6 and FIG. 7, the transmitting path 2 horizontally and longitudinally penetrates through two opposite sides of the housing 1. The transmitting path 2 longitudinally penetrates through two opposite sides of the supporting element 122. One side of the transmitting path 2 is located above the transmission module 4. The one side of the transmitting path 2 is located between a top surface of the transmission module 4 and one side of an upper surface 124 of the supporting element 122, and a bottom surface of the scanning unit 3. The one side of the transmitting path 2 forms a first channel 21 passing through one side surface of the housing 1, and the other side of the transmitting path 2 forms a second channel 22 passing through the other side surface of the housing 1. The second channel 22 horizontally penetrates through the other side of the supporting element 122. The transmission module 4 is partially projects into the first channel 21, and the transmission module 4 is located away from the second channel 22. The housing 1 has a universal serial bus (USB) insertion groove 14 penetrating through one end surface of the housing 1. The USB insertion groove 14 is used for being connected with a computer. In a concrete implementation, the transmission module 4 is also able to be disposed to and partially project into the second channel 22, and the transmission module 4 is also able to be disposed away from the first channel 21.

The one side of the top surface of the supporting element 122 is recessed downward to form a concave portion 31. Top surfaces of two sides of the concave portion 31 are plane and are flush with the upper surface 124 of the supporting element 122 of the lower housing 12. The corresponding mechanism of the transmission module 4 is disposed in the concave portion 31. The concave portion 31 is disposed adjacent to the first channel 21, and the concave portion 31 is disposed away from the second channel 22.

With reference to FIG. 3 to FIG. 6, the scanning unit 3 is arranged in the transmitting path 2 and partially projects into the first channel 21. The scanning unit 3 is partially arranged above the first channel 21. The scanning unit 3 includes a casing 31 of which a bottom is opened freely, a glass 32 assembled to the casing 31, an illumination component 33, a photoreceptor 34 and a circuit board 36. The circuit board 36 is covered on the casing 31. An inside of the casing 31 has a receiving space 301 penetrating through the bottom of the casing 31. The glass 32 is covered to the bottom of the casing 31 to form the receiving space 301 between the glass 32 and the casing 31. The illumination component 33 and the photoreceptor 34 are arranged in the receiving space 301. The photoreceptor 34 is aligned with and faces the glass 32. The photoreceptor 34 defines a scanning line 35 vertically disposed in the transmitting path 2. The illumination component 33 is also aligned with the glass 32 for illuminating the scanning line 35.

With reference to FIG. 3 to FIG. 12, compare the transmission module 4 of the portable scanner 100 with the first transmission module 200 and the second transmission module 201 of the portable scanner in prior art, the transmission module 4 of the portable scanner 100 decreases a group of the rollers, so that a purpose of reducing a volume of the portable scanner 100 is reached. In addition, when the portable scanner 100 proceeds with a scan, the binding edge 71 of the document 7 which is to be scanned will be without contacting the transmission module 4 to decrease a torsion force of the motor 81 to reach a purpose of lowering power consumption.

With reference to FIG. 2 to FIG. 7, the transmission module 4 is arranged in the transmitting path 2 and partially projects into the first channel 21, and the transmission module 4 is apart away from the second channel 22. The transmission module 4 is in contact with the scanning unit 3. The transmission module 4 is mounted under and contacts with the glass 32. The transmission module 4 includes a contacting point 41 contacting the glass 32, and a transmission roller 42.

In the preferred embodiment, the casing 31 is made of a plastic material. The scanning unit 3 and the transmission roller 42 are disposed to two facing sides of the first channel 21 of the transmitting path 2 along an up-down direction. The scanning unit 3 is disposed on and contacts with the transmission roller 42 in the first channel 21 of the transmitting path 2. The transmission roller 42 is mounted under and contacts the glass 32. The scanning unit 3 and the transmission roller 42 are disposed in the first channel 21 and away from the second channel 22. When the portable scanner 100 proceeds with the scan, the document 7 is clamped between the glass 32 and the transmission roller 42, the transmission roller 42 rolls to drive the document 7. The glass 32 has a hardness characteristic, a scratch resistance characteristic and a transparent characteristic. The transmission unit 4 has only one the transmission roller 42. A length of the transmission roller 42 is substantially equal to a width of the transmitting path 2.

Referring to FIG. 4 to FIG. 9, the transmission roller 42 is disposed under the scanning unit 3, and the transmission roller 42 is disposed in the first channel 21. The transmission roller 42 is connected with the motor 81. The transmission roller 42 is driven by the motor 81 to rotate in a forward direction or rotate in a reverse direction. The transmission roller 42 is disposed in the concave portion 123. When the transmission roller 42 rotates in the reverse direction to feed in the document 7 which has the binding edge 71 and is positioned in the portable scanner 100 from the first channel 21, the transmission roller 42 drives the document 7 having the binding edge 71 to be fed in until the transmission roller 42 rotates to feed in the document 7 having the binding edge 71 to a set distance, at the moment, the transmission roller 42 stops rotating. When the transmission roller 42 rotates in the forward direction to feed out the document 7 having the binding edge 71 from the first channel 21 to execute a scanning function of the portable scanner 100 to acquire an image of the document 7 having the binding edge 71. A preset time method, a person control or a sensor sensing method is able to be applied to make the transmission roller 42 rotate in the reverse direction to feed the document 7 to the set distance. In the concrete implementation, it is without being limited to the preset time method, the person control or the sensor sensing method.

When the document 7 having the binding edge 71 is scanned by the portable scanner 100, the transmission roller 42 rotates in the reverse direction, one edge of the document 7 having the binding edge 71 is fed into the transmitting path 2 through the first channel 21, the one edge of the document 7 having the binding edge 71 is opposite to the binding edge 71, the transmission roller 42 drives the document 7 having the binding edge 71 to enter the transmitting path 2 until the document 7 having the binding edge 71 is fed to the set distance, after the document 7 having the binding edge 71 is fed to the set distance, the transmission roller 42 stops rotating, and then, the transmission roller 42 rotates in the forward direction to feed the document 7 having the binding edge 71 out of the transmitting path 2 from the first channel 21, simultaneously, the scanning unit 3 scans the document 7 having the binding edge 71.

In another preferred embodiment, when the transmission roller 42 and the scanning unit 3 are disposed to the second channel 22 and away from the first channel 21, the transmission roller 42 rotates in the forward direction to feed in the document 7 having the binding edge 71 positioned from the second channel 22, the transmission roller 42 drives the document 7 having the binding edge 71 to be fed in until the transmission roller 42 rotates to feed in the document 7 having the binding edge 71 to the set distance, at the moment, the transmission roller 42 stops rotating, later, the transmission roller 42 rotates in the reverse direction to feed the document 7 having the binding edge 71 out of the transmitting path 2 from the second channel 22, simultaneously, the scanning unit 3 scans the document 7 having the binding edge 71.

Figure 7:
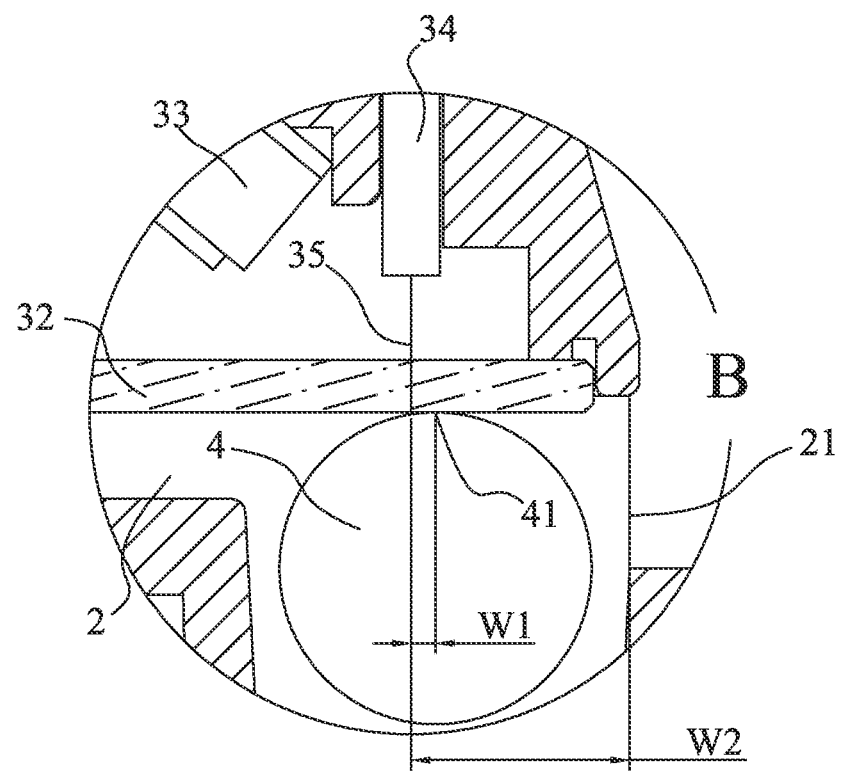
FIG. 7 is an enlarged view of an encircled portion B of the portable scanner shown in FIG. 6.

The photoreceptor 34 is located above and spaced from the contacting point 41 along an upstream-downstream direction. A horizontal distance W1 between the scanning line 35 and the contacting point 41 of the transmission module 4 is smaller than 2 mm to ensure that bound documents 7 which are to be scanned are flat at the time of the bound documents 7 passing through the scanning line 35. A position of the scanning line 35 shown in FIG. 7 is defined as an original position. When the contacting point 41 is located to a right side of the scanning line 35, the horizontal distance W1 between the scanning line 35 and the contacting point 41 is defined as a positive value, and when the contacting point 41 is located to a left side of the scanning line 35, the horizontal distance W1 between the scanning line 35 and the contacting point 41 is defined as a negative value. The horizontal distance W1 between contacting point 41 and the scanning line 35 is preferably ranged from −1 mm to 2 mm, and an ideal setting value of the horizontal distance W1 between the contacting point 41 and the scanning line 35 shown in this preferred embodiment is preferably 0.5 mm.

Referring to FIG. 1, the at least one memory 52 includes at least one execution module 53 stored in the at least one memory 52. The at least one execution module 53 has a plurality of instructions for scanning the bound documents 7. The at least one execution module 53 has the plurality of the instructions for scanning the document 7 having the binding edge 71. The at least one execution module 53 is configured for executing the plurality of the instructions by the at least one memory 52 and the at least one processor 51.

With reference to FIG. 1 to FIG. 11, FIG. 11 is a flow chart showing a scanning process of the portable scanner 100 for scanning the bound documents 7. The portable scanner 100 is set to a preparing status 600, and in the preparing status 600, the portable scanner 100 waits for activating actions, such as a predefined user input action. In some preferred embodiments, the portable scanner 100 displays on the user interaction unit 6, one or more visual cues of the activating actions may be performed by a user to start scanning in the preparing status 600. The visual cues may be textual, graphical or other combinations.

The activating actions include an entry of the bound documents 7 which are to be scanned. In some preferred embodiments, the activating actions are that the bound documents 7 which are to be scanned are inserted into the transmitting path 2, and the portable scanner 100 detects the entry of the bound documents 7 with the scanning unit 3. The visual cues shown in preparing status 600 also instruct the user to insert a page of the bound documents 7 which are to be scanned into the transmitting path 2.

Figure 8:
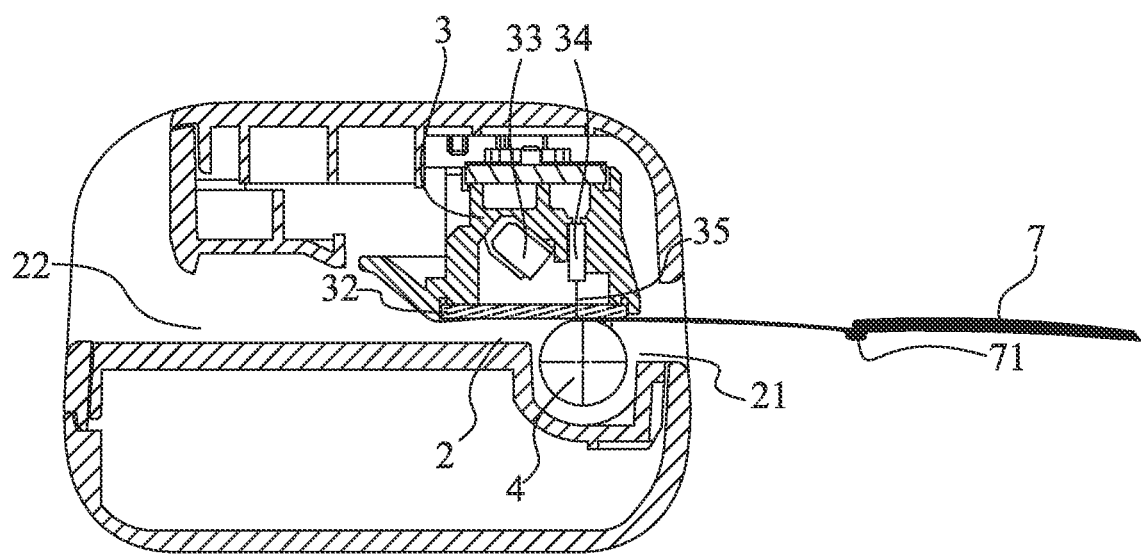
FIG. 8 shows a sectional diagram of the portable scanner in accordance with the first preferred embodiment of the present invention, wherein a document is partially positioned to the portable scanner in accordance with the first preferred embodiment to be scanned.

When the activating actions 602 are detected, the portable scanner 100 is started transmitting the document 7 having the binding edge 71 which is to be scanned from the first channel 21 towards the second channel 22 by use of the transmission module 4 shown in FIG. 8. In some preferred embodiments, the document 7 having the binding edge 71 which is to be scanned is transmitted for a predefined distance, and a transmitting distance of the document 7 having the binding edge 71 is decided according to a length of the page of the document 7 having the binding edge 71. For example, if the user tries to scan a passport, since most passports are 8.5 cm in width and 12.5 cm in length, so a width of the passport from a free edge to the binding edge 71 of each page in this passport is 8.5 cm, and the transmitting distance of the passport in this preferred embodiment is good to be set to 8.5 cm. Furthermore, most bound documents 7, such as books or pamphlets are available in specific sizes, so in some preferred embodiments, the predefined distance has a set default data for each page of the bound documents 7.

Figure 9:
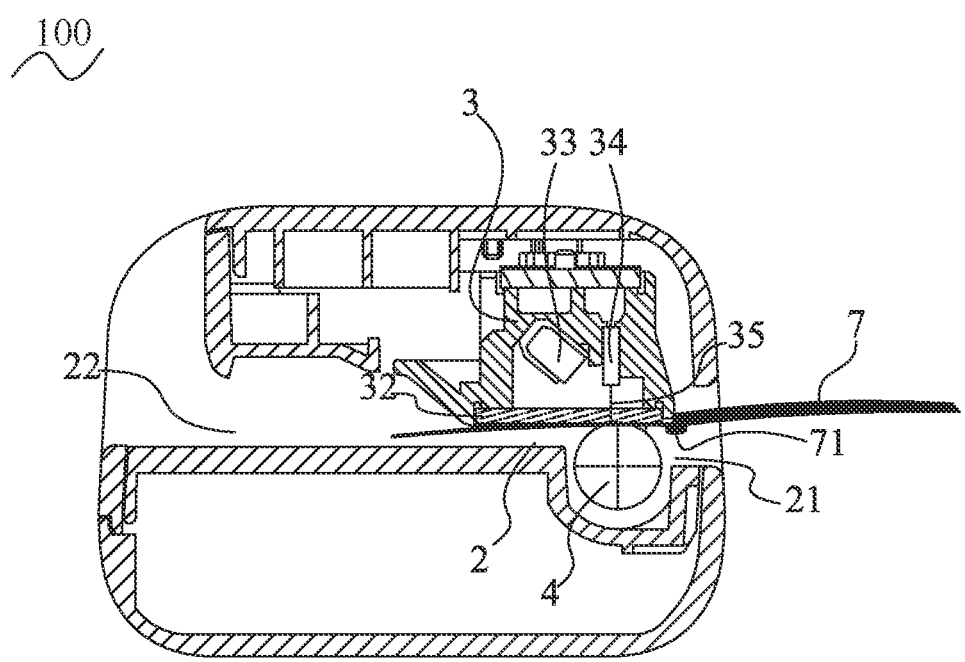
FIG. 9 shows another sectional diagram of the portable scanner in accordance with the first preferred embodiment of the present invention, wherein the document is partially transmitted in the portable scanner according to the first preferred embodiment of the present invention.
Figure 10:
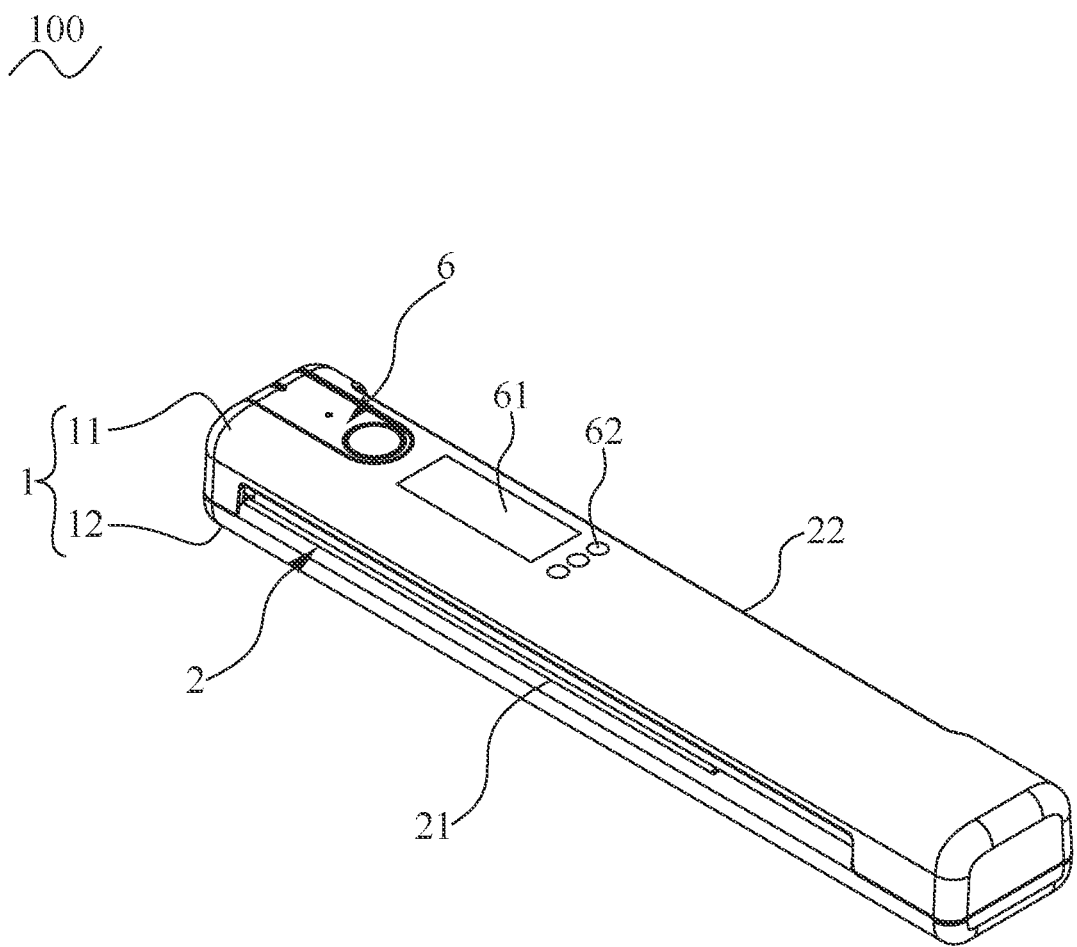
FIG. 10 is a perspective view of a portable scanner in accordance with a second preferred embodiment of the present invention.
Figure 11:
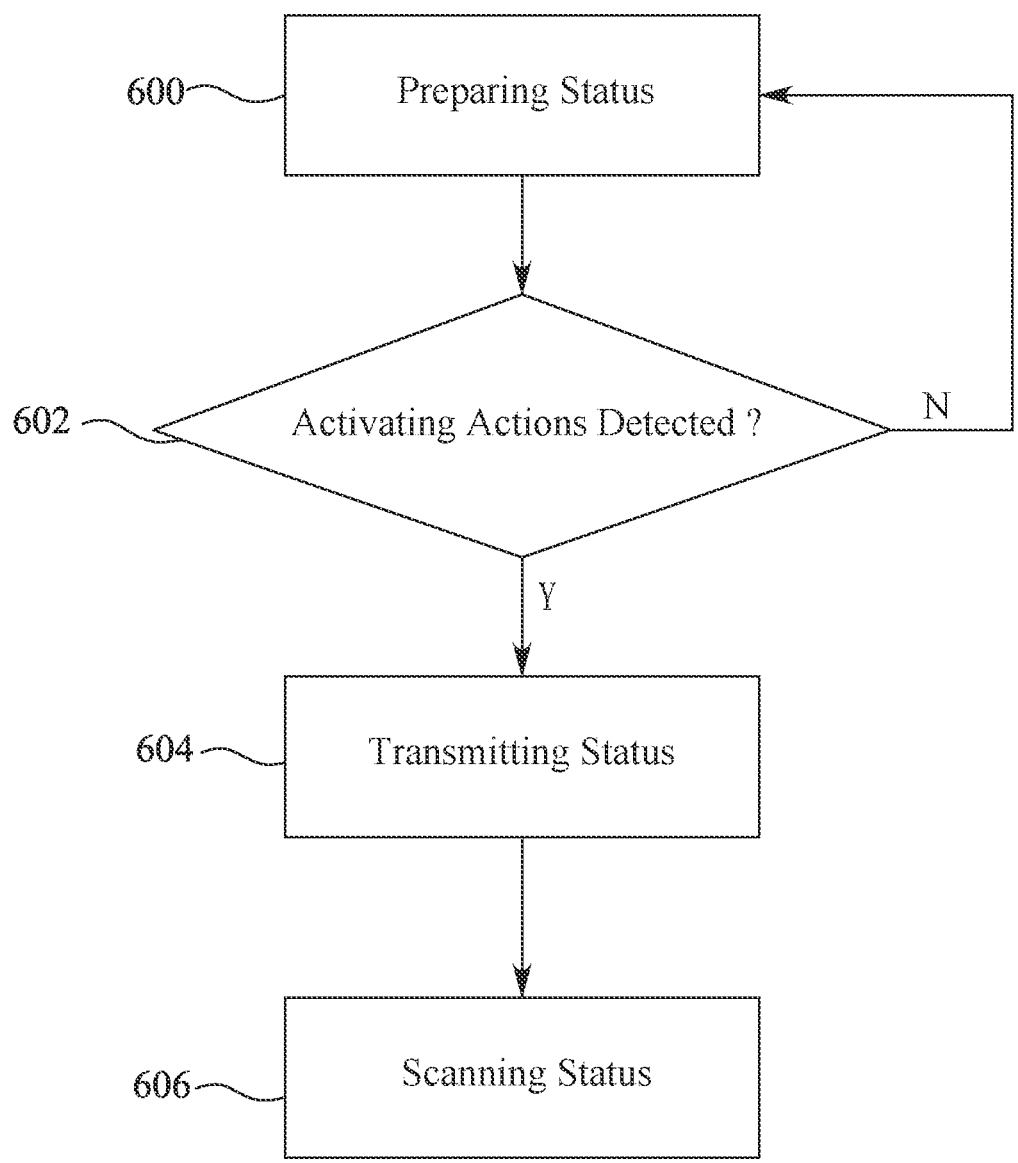
FIG. 11 is a flow chart showing a scanning process of the portable scanner in accordance with the present invention.
Figure 12:
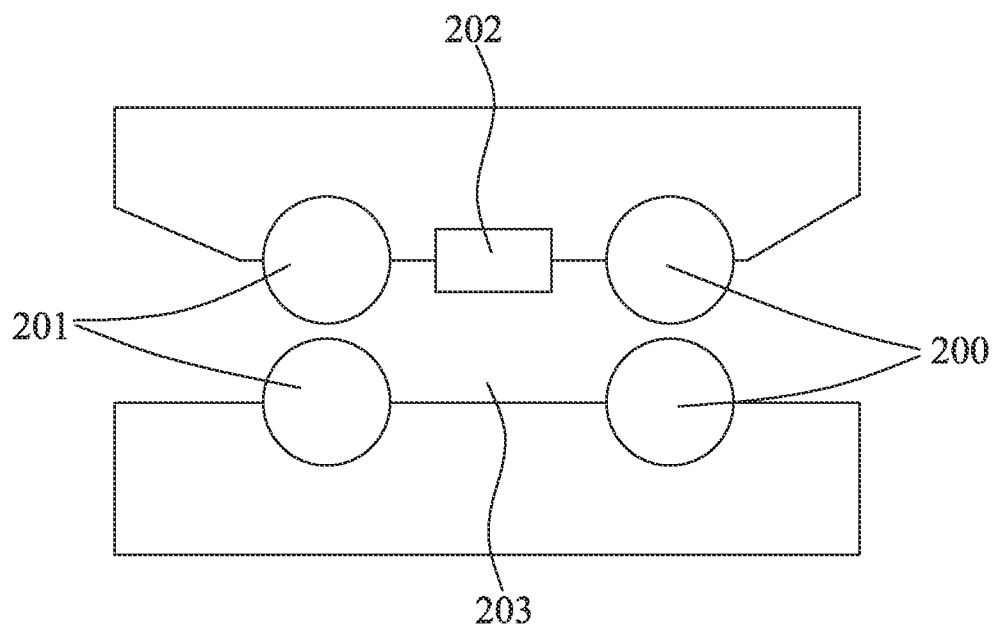
FIG. 12 shows a sectional diagram of a portable scanner in prior art.
Figure 13:
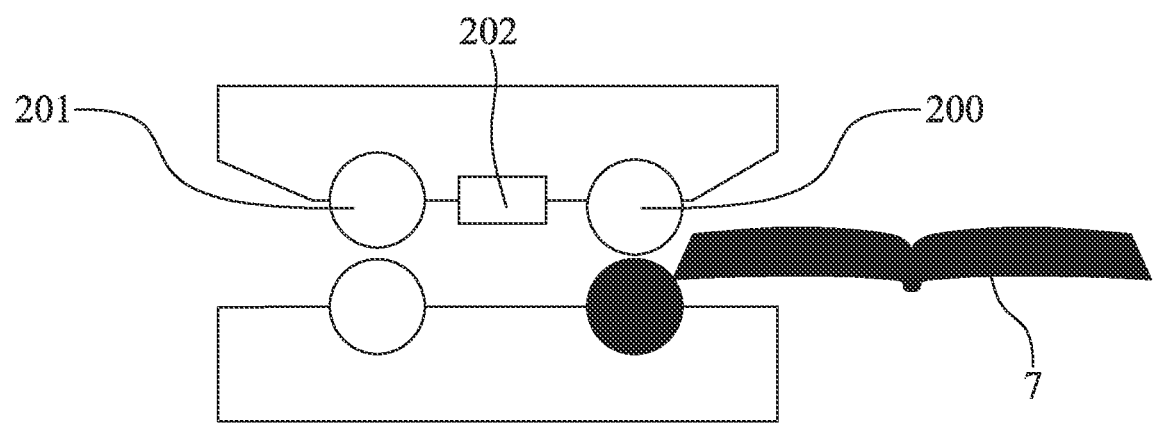
FIG. 13 is a sectional diagram of the portable scanner of FIG. 12, wherein thicker bound documents are positioned to the portable scanner of FIG. 12.
Figure 14:
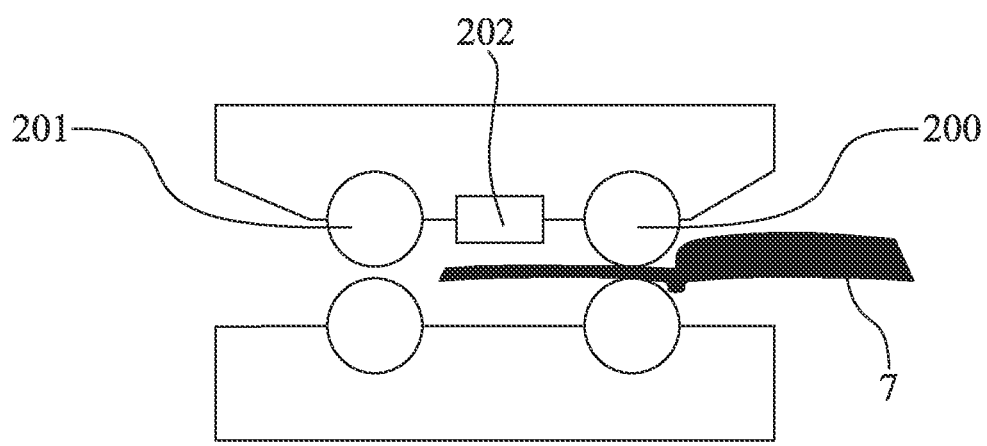
FIG. 14 is another sectional diagram of the portable scanner of FIG. 12, wherein the thicker bound documents are partially transmitted in the portable scanner.
Figure 15:
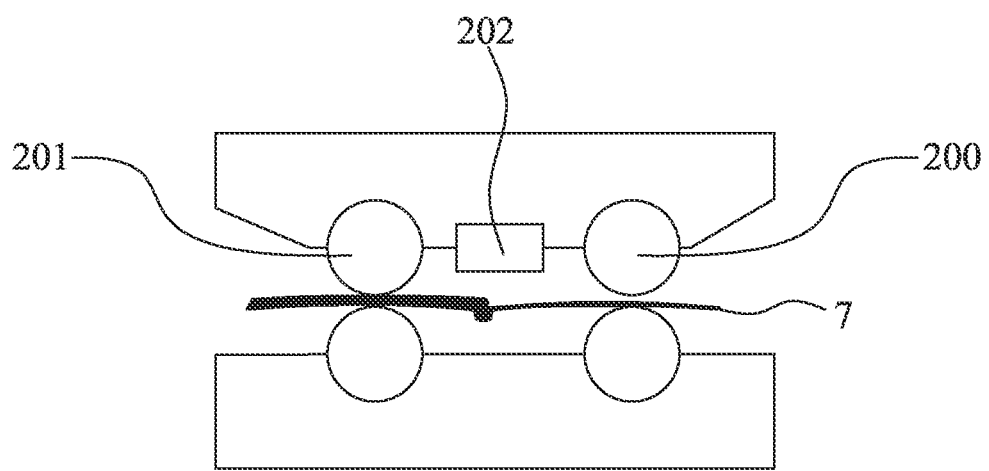
FIG. 15 is a sectional diagram of the portable scanner of FIG. 12, wherein the bound documents are transmitted in the portable scanner and thicknesses of two sides of the bound documents are different.

Referring to FIG. 9, when the transmitting distance is equal to the predefined distance, most areas of the page of the bound documents 7 which are to be scanned is located at the left side of the scanning line 35, and the binding edge 71 of each page of the bound documents 7 is able to abut against a wall of the first channel 21. The portable scanner 100 starts ejecting the document 7 having the binding edge 71 from the first channel 21 by virtue of the transmission module 4 rotating in the forward direction, and at the same time, the portable scanner 100 captures image data on the document 7 having the binding edge 71 with the scanning unit 3.

With reference to FIG. 1 to FIG. 9, before the binding edge 71 of each page of the bound documents 7 enters the transmitting path 2, the portable scanner 100 ejects the bound documents 7, so the portable scanner 100 according to the present invention avoids a problem occurred, such as the bound documents 7 are too thick to fit in the transmitting path 2 or the transmission module 4 is unable to stably contact with the bound documents 7 which is to be scanned.

For an explanation convenience, an area of the page of the document 7 which is to be scanned located at the left side of the scanning line 35 in a transmitting status 604 is defined as a capturable area, and an area of the page located at the right side of the scanning line 35 is defined as a remaining area which is incapable of being captured. In order to maximize the capturable area, the scanning unit 3 is preferred to be disposed to the first channel 21 as possible on account of a size of the capturable area only being affected by a position of the scanning unit 3. In some preferred embodiments, the first channel 21 is located to the right side of the scanning line 35, a horizontal distance W2 between the scanning line 35 and a right side of the first channel 21 is less than 4 mm, and an ideal value of the horizontal distance W2 between the scanning line 35 and the right side of the first channel 21 is 1 mm.

Figure 6:
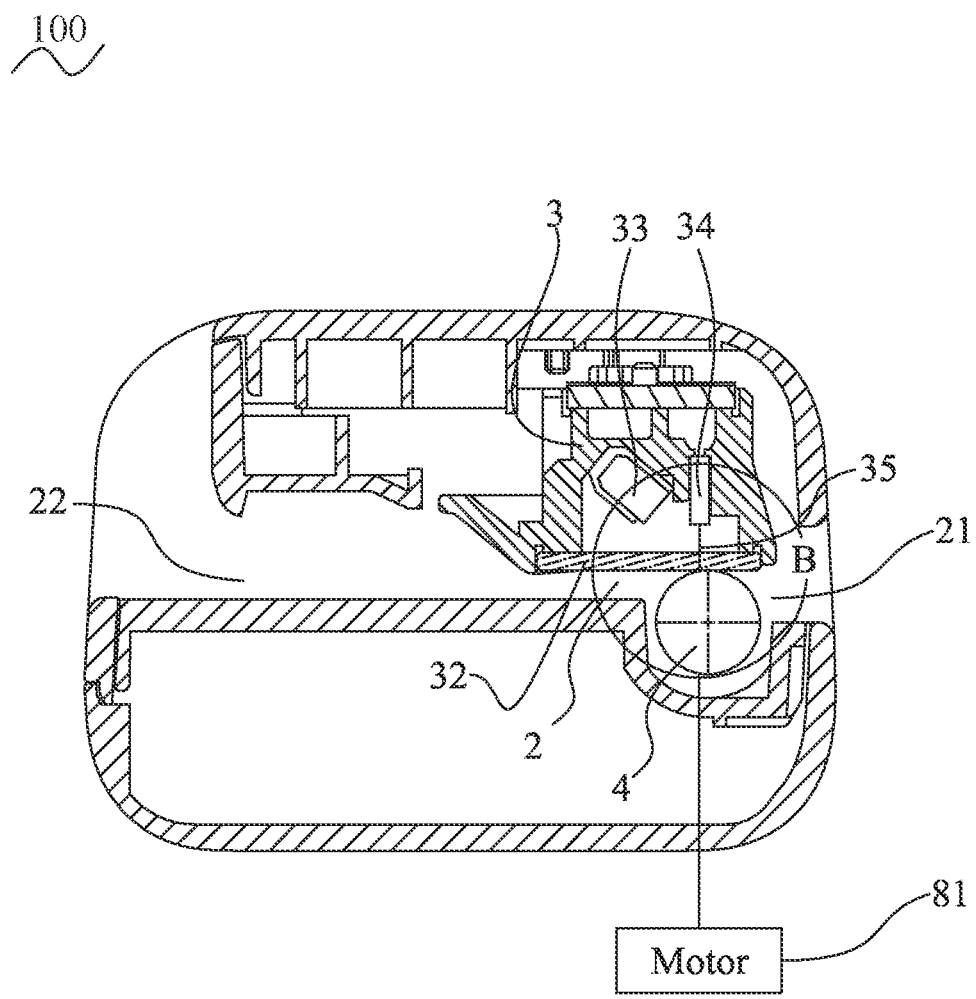
FIG. 6 shows a sectional view of the portable scanner along a line VI-VI of FIG. 2.

In order to arrange the scanning unit 3 located to the first channel 21, the transmission module 4 has to be arranged very close to the scanning unit 3. As shown in FIG. 6 and FIG. 7, when the horizontal distance W2 between the scanning line 35 and the first channel 21 is set to be 1 mm, the horizontal distance W1 between the scanning line 35 and the contacting point 41 is 0.5 mm, so that more than a half of the transmission module 4 is located at the left side of the scanning line 35. Correspondingly, there is insufficient space to arrange one of the first transmission module 200 and the second transmission module 201 of the portable scanner in the prior art which are set as the two rollers to keep the scanning unit 3 in a middle of the two rollers.

In some preferred embodiments, the user may adjust the predefined distance in the preparing status 600, and the user interaction unit 6 further includes at least one input component 62 for a data entry. The user is able to adjust and select the predefined distance from the set default data of inputting customized data via a display component 61 and the at least one input component 62.

In some other feasible embodiments, the portable scanner 100 transmits the document 7 having the binding edge 71 which is to be scanned from the first channel 21 towards the second channel 22 till the binding edge 71 of each page of the bound documents 7 which is to be scanned reaches the first channel 21 in the transmitting status 604, and then a scanning status 606 is reached.

In some preferred embodiments, the portable scanner 100 further includes a torque meter (not shown) connected to the transmission module 4 for monitoring a torque of the transmission module 4. When the binding edge 71 of each page of the bound documents 7 which are to be scanned abuts against the wall of the first channel 21, the bound documents 7 will be stopped by the housing 1, and a load of the transmission module 4 is increased. Therefore, whether the binding edge 71 of each page of the bound documents 7 abuts against the wall of the first channel 21 is able to be detect by measuring the torque of the transmission module 4 with the torque meter.

In some preferred embodiments, the portable scanner 100 further includes a sensor (not shown) arranged next to the first channel 21. When the binding edge 71 of each page of the bound documents 7 which are to be scanned abuts against the wall of the first channel 21, the sensor will be triggered by the binding edge 71 of any page of the bound documents 7 which are to be scanned. Therefore, whether the binding edge 71 of any page of the bound documents 7 abuts against the wall of the first channel 21 is able to be detect by the sensor.

Working statuses of the portable scanner 100 are described as follows. When the portable scanner 100 scans thin paper, or a thin card, the thin paper or the thin card enters the transmitting path 2 through the second channel 22. When a front end of the thin paper or the thin card arrives at the transmission roller 42, the transmission roller 42 rotates in the forward direction to drive the thin paper or the thin card, simultaneously, the scanning unit 3 starts scanning the thin paper or the thin card, at the moment, the thin paper or the thin card which is scanned is gradually fed out of the transmitting path 2 from the first channel 21. When a tail end of the thin paper or the thin card passes through the scanning unit 3, the portable scanner 100 completes scanning the thin paper or the thin card, the thin paper or the thin card is driven by the transmission roller 42 to be fully fed out of the transmitting path 2 from the first channel 21.

When the document 7 without the binding edge 71 is scanned by the portable scanner 100, the document 7 without the binding edge 71 enters the transmitting path 2 through the second channel 22, at the time of the front end of the document 7 without the binding edge 71 contacting the transmission roller 42, the transmission roller 42 drives the document 7 without the binding edge 71 to be fed out of the transmitting path 2 through the first channel 21, simultaneously, the scanning unit 3 scans the document 7 without the binding edge 71 until the tail end of the document 7 without the binding edge 71 leaving the transmission roller 42.

Referring to FIG. 6 to FIG. 9, when the portable scanner 100 scans the document 7 having a thickness or the binding edge 71, the document 7 having the thickness or the binding edge 71 enters the transmitting path 2 through the first channel 21. When the transmission roller 42 rotates in the reverse direction to feed in the document 7 having the thickness or the binding edge 71 from the first channel 21, the transmission roller 42 drives the document 7 having the thickness or the binding edge 71 to be fed in until the transmission roller 42 rotates to feed in the document 7 having the thickness or the binding edge 71 to the set distance, at the moment, the transmission roller 42 stops rotating. Later, the transmission roller 42 rotates in the forward direction to feed out the document 7 having the thickness or the binding edge 71 from the first channel 21, simultaneously, the scanning unit 3 executes the scanning function to acquire the image of the document 7 having the thickness or the binding edge 71. The preset time method, the person control or the sensor sensing method is able to be applied to the set distance.

As described above, when the portable scanner 100 scans the thin paper, or the thin card, the thin paper or the thin card enters the transmitting path 2 through the second channel 22, and the thin paper or the thin card is fed out of the transmitting path 2 from the first channel 21, and when the portable scanner 100 scans the document 7 having the thickness or the binding edge 71, the document 7 having the thickness or the binding edge 71 enters the transmitting path 2 through the first channel 21, the transmission roller 42 rotates in the reverse direction to feed in the document 7 having the thickness or the binding edge 71 from the first channel 21, the transmission roller 42 drives the document 7 having the thickness or the binding edge 71 to be fed in until the transmission roller 42 rotates to feed in the document 7 having the thickness or the binding edge 71 to the set distance, at the moment, the transmission roller 42 stops rotating, later, the transmission roller 42 rotates in the forward direction to feed out the document 7 having the thickness or the binding edge 71 from the first channel 21, simultaneously, the scanning unit 3 executes the scanning function to acquire the image of the document 7 having the thickness or the binding edge 71. The preset time method, the person control or the sensor sensing method is able to be applied to the set distance. Furthermore, the torsion force of the motor 81 is decreased to lower the power consumption by virtue of the transmission roller 42 of the portable scanner 100 being without contacting the binding edge 71 of the document 7. As a result, the portable scanner 100 has a smaller size, a lower cost and is without limiting the thickness of the scanned document 7.

What is claimed is:

1. A portable scanner adapted for scanning a document having a binding edge or the document without the binding edge, the portable scanner comprising:

a housing;

a transmitting path horizontally and longitudinally penetrating through two opposite sides of the housing, one side of the transmitting path forming a first channel passing through one side surface of the housing, and the other side of the transmitting path forming a second channel passing through the other side surface of the housing;

a scanning unit arranged in the transmitting path and partially projecting into the first channel; and a transmission module arranged in the transmitting path and partially projecting into the first channel, the transmission module being in contact with the scanning unit, the transmission module including a transmission roller, the scanning unit and the transmission roller being disposed to two facing sides of the transmitting path along an up-down direction, the scanning unit being disposed on and contacting with the transmission roller in the first channel of the transmitting path, the scanning unit and the transmission roller being disposed in the first channel and away from the second channel, the transmission roller being driven to rotate in a forward direction or rotate in a reverse direction, wherein when the document having the binding edge is scanned by the portable scanner, the transmission roller rotates in the reverse direction, one edge of the document having the binding edge is fed into the transmitting path through the first channel, the one edge of the document having the binding edge is opposite to the binding edge, the transmission roller drives the document having the binding edge to enter the transmitting path until the document having the binding edge is fed to a set distance, after the document having the binding edge is fed to the set distance, the transmission roller stops rotating, and then, the transmission roller rotates in the forward direction to feed the document having the binding edge out of the transmitting path from the first channel, simultaneously, the scanning unit scans the document having the binding edge, and wherein when the document without the binding edge is scanned by the portable scanner, the document without the binding edge enters the transmitting path through the second channel, at the time of a front end of the document without the binding edge contacting the transmission roller, the transmission roller drives the document without the binding edge to be fed out of the transmitting path through the first channel, simultaneously, the scanning unit scans the document without the binding edge until a tail end of the document without the binding edge leaving the transmission roller.

2. The portable scanner as claimed in claim 1, wherein the housing includes an upper housing and a lower housing interlocked with the upper housing, the transmitting path is formed between the upper housing and the lower housing.

3. The portable scanner as claimed in claim 2, wherein the lower housing includes a base portion, and a supporting element mounted on the base portion, one side of a top surface of the supporting element is recessed downward to form a concave portion, top surfaces of two sides of the concave portion are plane and are flush with a lower surface of the supporting element of the lower housing, the concave portion is disposed adjacent to the first channel, and the concave portion is disposed away from the second channel, the transmission roller is disposed in the concave portion.

4. The portable scanner as claimed in claim 1, wherein the scanning unit includes a casing of which a bottom is opened freely, a glass, an illumination component, a photoreceptor and a circuit board, the casing is made of a plastic material, the circuit board is covered on the casing, an inside of the casing has a receiving space penetrating through the bottom of the casing, the glass is covered to the bottom of the casing, the illumination component and the photoreceptor are arranged in the receiving space, the transmission roller is mounted under and contacts the glass.

5. The portable scanner as claimed in claim 4, wherein the photoreceptor defines a scanning line vertically disposed in the transmitting path, the first channel is located to a right side of the scanning line, a horizontal distance between the scanning line and a right side of the first channel is less than 4 mm.

6. The portable scanner as claimed in claim 4, wherein the photoreceptor defines a scanning line vertically disposed in the transmitting path, the first channel is located to a right side of the scanning line, a horizontal distance between the scanning line and a right side of the first channel is 1 mm.

7. The portable scanner as claimed in claim 4, wherein the photoreceptor defines a scanning line vertically disposed in the transmitting path, the transmission module includes a contacting point contacting the glass, when the contacting point is located to a right side of the scanning line, a horizontal distance between the scanning line and the contacting point is defined as a positive value, and when the contacting point is located to a left side of the scanning line, the horizontal distance between the scanning line and the contacting point is defined as a negative value, the horizontal distance between contacting point and the scanning line is preferably ranged from −1 mm to 2 mm.

8. The portable scanner as claimed in claim 7, wherein a setting value of the horizontal distance between the contacting point and the scanning line is preferably 0.5 mm.

9. The portable scanner as claimed in claim 1, wherein the housing has a universal serial bus insertion groove penetrating through one end surface of the housing.

10. The portable scanner as claimed in claim 1, further comprising at least one memory including at least one execution module stored in the at least one memory, and a user interaction unit arranged on a surface of the housing, the user interaction unit further including at least one input component for a data entry, a user being able to adjust and select a predefined distance from set default data of inputting customized data via a display component and the at least one input component, the at least one execution module having a plurality of instructions for scanning bound documents.

11. The portable scanner as claimed in claim 1, further comprising at least one memory, and at least one processor, the at least one memory including at least one execution module stored in the at least one memory, the at least one execution module having a plurality of instructions for scanning bound documents, the at least one execution module being configured for executing the plurality of the instructions by the at least one memory and the at least one processor.

12. The portable scanner as claimed in claim 1, further comprising a motor mounted to the housing.

13. A portable scanner adapted for scanning a document having a binding edge, the portable scanner comprising:
a housing;
a transmitting path longitudinally penetrating through two opposite sides of the housing, one side of the transmitting path forming a first channel passing through one side surface of the housing, and the other side of the transmitting path forming a second channel passing through the other side surface of the housing;
a scanning unit arranged in the transmitting path and partially projecting into the first channel;
at least one memory including at least one execution module stored in the at least one memory, the at least one execution module having a plurality of instructions for scanning the document having the binding edge; and
a transmission module arranged in the transmitting path and partially projecting into the first channel, the transmission module being in contact with the scanning unit, the transmission module including a transmission roller, the scanning unit and the transmission roller being disposed to two facing sides of the transmitting path along an up-down direction, the scanning unit being disposed on and contacting with the transmission roller in the first channel of the transmitting path, the scanning unit and the transmission roller being disposed in the first channel and away from the second channel, the transmission roller being driven to rotate in a forward direction or rotate in a reverse direction,
wherein when the document having the binding edge is scanned by the portable scanner, the transmission roller rotates in the reverse direction, one edge of the document having the binding edge is fed into the transmitting path through the first channel, the one edge of the document having the binding edge is opposite to the binding edge, the transmission roller drives the document having the binding edge to enter the transmitting path until the document having the binding edge is fed to a set distance, after the document having the binding edge is fed to the set distance, the transmission roller stops rotating, and then, the transmission roller rotates in the forward direction to feed the document having the binding edge out of the transmitting path from the first channel, simultaneously, the scanning unit scans the document having the binding edge.

14. The portable scanner as claimed in claim 13, wherein the housing includes an upper housing and a lower housing interlocked with the upper housing, the transmitting path is formed between the upper housing and the lower housing.

15. The portable scanner as claimed in claim 14, wherein the lower housing includes a base portion, and a supporting element mounted on the base portion, one side of a top surface of the supporting element is recessed downward to form a concave portion, top surfaces of two sides of the concave portion are plane and are flush with a lower surface of the supporting element of the lower housing, the concave portion is disposed adjacent to the first channel, and the concave portion is disposed away from the second channel, the transmission roller is disposed in the concave portion.

16. The portable scanner as claimed in claim 13, wherein the scanning unit includes a casing of which a bottom is opened freely, a glass, an illumination component, a photoreceptor and a circuit board, the casing is made of a plastic material, the circuit board is covered on the casing, an inside of the casing has a receiving space penetrating through the bottom of the casing, the glass is covered to the bottom of the casing, the illumination component and the photoreceptor are arranged in the receiving space, the transmission roller is mounted under and contacts the glass.

17. The portable scanner as claimed in claim 16, wherein the photoreceptor defines a scanning line vertically disposed in the transmitting path, the first channel is located to a right side of the scanning line, a horizontal distance between the scanning line and a right side of the first channel is less than 4 mm.

18. The portable scanner as claimed in claim 16, wherein the photoreceptor defines a scanning line vertically disposed in the transmitting path, the first channel is located to a right side of the scanning line, an ideal value of a horizontal distance between the scanning line and a right side of the first channel is 1 mm.

19. The portable scanner as claimed in claim 16, wherein the photoreceptor defines a scanning line vertically disposed in the transmitting path, the transmission module includes a contacting point contacting the glass, when the contacting point is located to a right side of the scanning line, a horizontal distance between the scanning line and the contacting point is defined as a positive value, and when the contacting point is located to a left side of the scanning line, the horizontal distance between the scanning line and the contacting point is defined as a negative value, the horizontal distance between contacting point and the scanning line is preferably ranged from −1 mm to 2 mm.

* * * * *